United States Patent [19]
Hara et al.

[11] Patent Number: 6,083,294
[45] Date of Patent: Jul. 4, 2000

[54] METHOD OF TREATING DUST EXHAUSTED FROM MELTING FURNACE

[75] Inventors: Toshikatsu Hara, Nisshin; Hirohiko Sasamoto, Aichi-ken; Yuji Okada; Kazuhiro Suzuki, both of Toyota, all of Japan

[73] Assignees: Aichi Steel Works, Ltd., Tokai; Toyota Jidosha Kabushiki Kaisha; Toyokin Co., Ltd., both of Toyota, all of Japan

[21] Appl. No.: 08/895,279

[22] Filed: Jul. 16, 1997

[30] Foreign Application Priority Data

Jul. 17, 1996 [JP] Japan .................................. 8-207823

[51] Int. Cl.$^7$ ........................... C21B 11/10; C22B 19/04; C22B 13/00
[52] U.S. Cl. ........................... 75/10.38; 75/369; 75/659; 75/694
[58] Field of Search ........................... 75/367, 10.38, 75/10.44, 659, 694

[56] References Cited

U.S. PATENT DOCUMENTS

| | | |
|---|---|---|
| 2,127,632 | 8/1938 | Najarian et al. . |
| 2,206,117 | 3/1940 | Osborn et al. .......................... 75/10.44 |
| 2,920,951 | 1/1960 | Bretschneider et al. . |
| 4,200,454 | 4/1980 | Maelzer et al. ............................. 75/694 |
| 4,434,001 | 2/1984 | Edstrom et al. ........................ 74/10.44 |
| 4,673,431 | 6/1987 | Bricmont ................................... 75/694 |
| 5,004,496 | 4/1991 | Aune et al. ............................. 75/10.28 |
| 5,364,447 | 11/1994 | Philipp et al. ............................. 75/658 |

FOREIGN PATENT DOCUMENTS 52-131903  11/1977  Japan .

OTHER PUBLICATIONS

Lide, David R., ed. CRC Handbook of Chemistry and Physics 79th ed. 1998 p. 9–74.

*Primary Examiner*—Prince Willis
*Assistant Examiner*—Tima McGuthry-Banks
*Attorney, Agent, or Firm*—Oblon, Spivak, McClelland, Maier & Neustadt, P.C.

[57] ABSTRACT

A method of treating dust exhausted from a melting furnace in melting an iron-contained material, comprising the steps of: melting the iron-contained material, with air inside the melting furnace shut out from outside air and collecting the dust from the melting furnace into which a gas exhausted from the melting furnace and containing the dust is introduced; performing a lead-collecting process of collecting water, chloride, fluorine, and lead by heating the exhausted dust in vacuum; and performing a zinc-collecting process of collecting metallic zinc contained in the dust by heating a residue of the exhausted dust in vacuum.

7 Claims, 2 Drawing Sheets

METHOD OF TREATING DUST EXHAUSTED FROM MELTING FURNACE

BACKGROUND OF THE INVENTION

1. Field of the Invention

The present invention relates to a method of treating a dust containing lead, zinc, and other substances and exhausted from a melting furnace to recover metallic zinc at a high purity from the dust.

2. Description of the Related Arts

A material containing iron, lead, zinc, and other substances (hereinafter referred to as iron-contained material) such as scrap discarded by a galvanizing factories can be reclaimed by melting it in a melting furnace and then performing vacuum heating treatment. Various types of melting furnaces can be used to melt the iron-contained material. For example, an electric melting furnace 9 having electrodes 91, 92, and 93 is known, as shown in FIG. 2. In melting an iron-contained material 8 by using the melting furnace 9, unburnt CO gas is subjected to secondary combustion by introducing air thereinto from openings 96 and 97 thereof to increase the melting efficiency. A dust 98 is exhausted from the iron-contained material 8 when it is melted. The exhausted dust 98 is collected by a dust collector 2.

Because the iron-contained material 8 consists of pressed scraps of galvanized sheets, the exhausted dust 98 contains iron, zinc, lead, and other elements.

Table 1 shows an example of a result obtained by analyzing the contents of the exhausted dust 98. The exhausted dust 98 contains 35% of iron Fe, 18.2% of zinc (Zn), and other elements. Most of the iron was present in the form of ferric oxide ($Fe_2O_3$) and almost all of the zinc was present in the form of zinc oxide (ZnO).

In Table 1 and subsequent Tables 2 to 4, the term "T.Fe" represents whole amount of Fe contained in the exhausted dust and the term "M.Fe" represents the amount of metallic iron contained in the exhausted dust.

SUMMARY OF THE INVENTION

The present invention has been made in view of the above-described problems. It is accordingly an object of the present invention to provide a method of treating an exhausted dust resulting from a melted material containing iron, lead, and zinc, without adding a reducing agent to the exhausted dust.

In one aspect of the present invention, there is provided a method of treating dust exhausted from a melting furnace in melting an iron-contained material, comprising the steps of:

melting the iron-contained material, with air inside the melting furnace shut out from outside air and collecting the dust from the melting furnace into which a gas exhausted from the melting furnace and containing the dust is introduced;

performing a lead-collecting process of collecting water, chloride, fluorine, and lead by heating the exhausted dust in vacuum; and performing a zinc-collecting process of collecting metallic zinc contained in the dust by heating a residue of the exhausted dust in vacuum.

This and other objects, features and advantages of the present invention will become apparent upon a reading of the following detailed description and drawings.

DETAILED DESCRIPTION OF THE PREFERRED EMBODIMENTS

Figure 1:
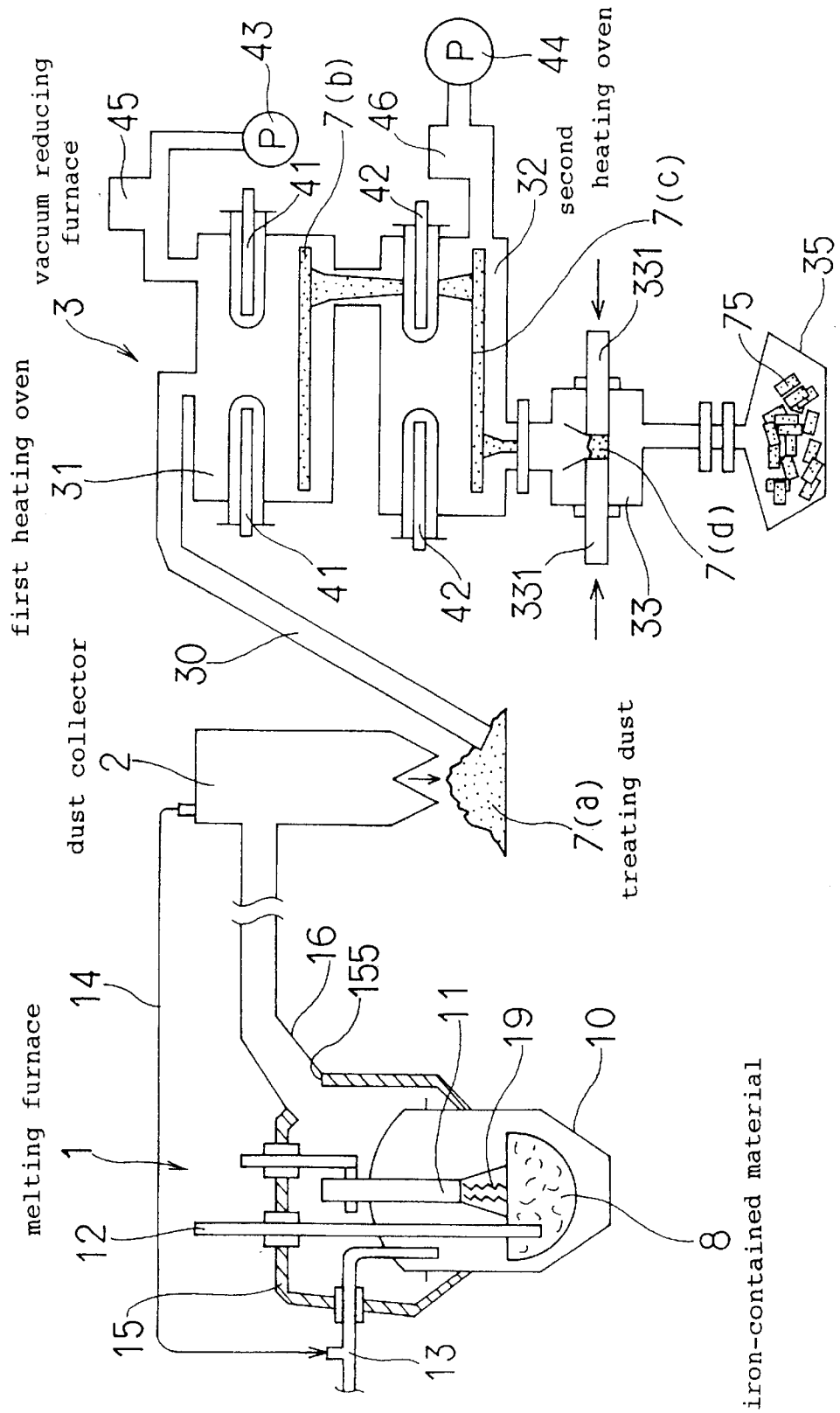
FIG. 1 is an explanatory view showing the construction of an equipment for treating an exhausted dust according to an embodiment 1.
Figure 2:
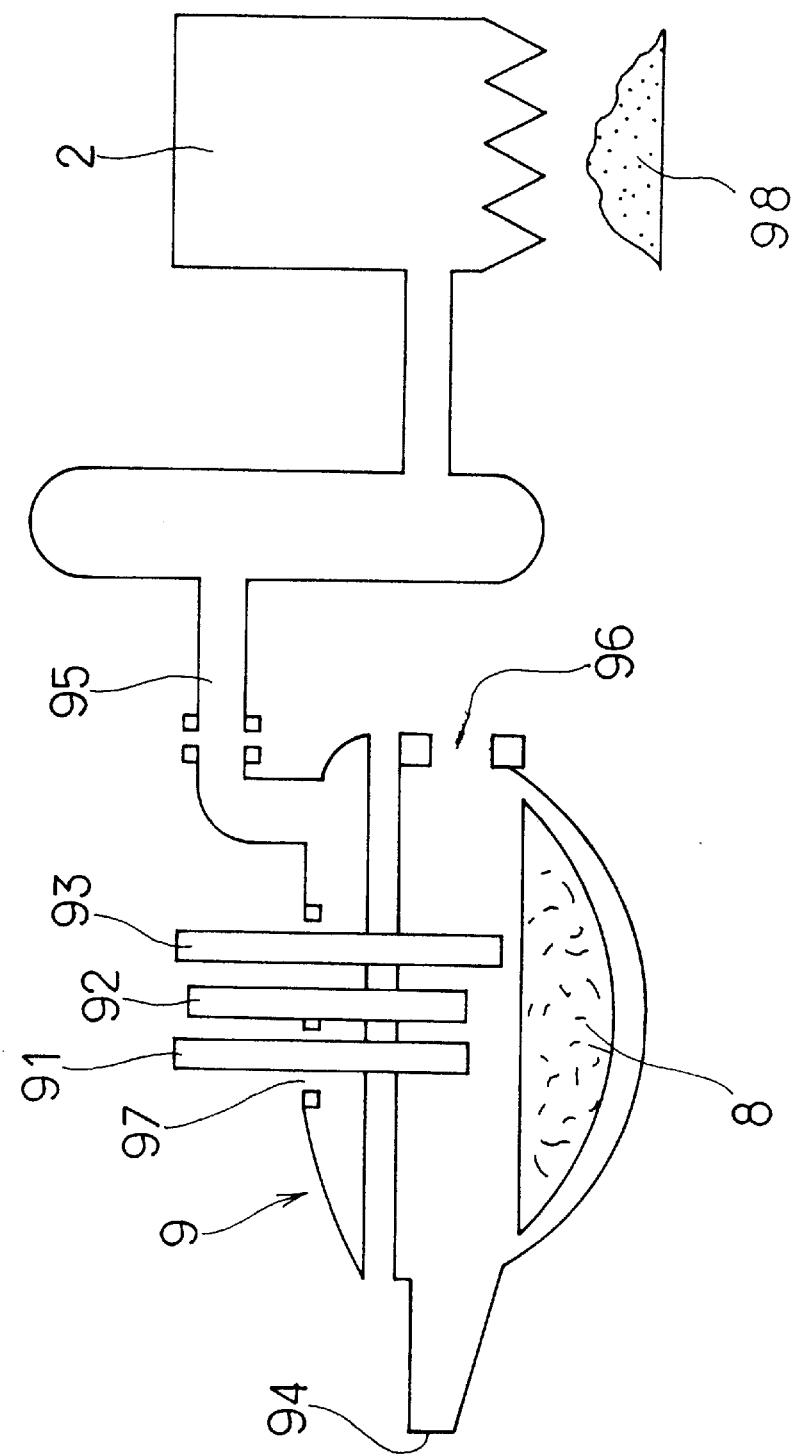
FIG. 2 is an explanatory view showing the construction of a conventional melting furnace.

The present invention is characterized in that a material containing iron, lead, zinc, and other substances (hereinafter referred to as iron-contained material) is melted, with the air inside the melting furnace shut out from the outside air. The

TABLE 1

| | Substances of exhausted dust generated by conventional method | | | | | | | | | | |
|---|---|---|---|---|---|---|---|---|---|---|---|
| Substances | T.Fe | M.Fe | FeO | $Fe_2O_3$ | Zn | Mn | Pb | Al | Cl | F | O |
| wt. % | 35 | 2 | 0 | 50.2 | 18.2 | 2.76 | 2.48 | 0.38 | 4.56 | 0.01 | bal. |

T.Fe: Whole amount of Fe
M.Fe: Amount of metallic iron
(This applies correspondingly to Tables 2, 3 and 4)

Because the exhausted dust 98 contains a large amount of the zinc oxide as described above, it is difficult to reclaim the iron-contained material 8 from the exhausted dust 98. The reduction of the zinc oxide to metal allows not only the exhausted dust 98 but also the metallic zinc to be reclaimed effectively.

Methods of heating the exhausted dust in vacuum, together with a reducing agent have been proposed to recover the metallic zinc from the exhausted dust 98.

In the conventional vacuum heating method, it is necessary to carry out a process of keeping the addition of the reducing agent to the exhausted dust. Because the reducing agent-adding process involves a complicated procedure, there is a demand for the development of an improved method of treating the exhausted dust.

state in which the air inside the melting furnace is shut out from the outside air means that fresh air is not positively introduced into the melting furnace. More specifically, as will be described later, the iron-contained material is melted in the melting furnace by injecting gas generating a non-oxidizing atmosphere thereinto, with a fresh air-introducing portion thereof sealed out from the outside air.

As the iron-contained material, a material containing zinc such as pressed scraps of galvanized sheets is used as the iron-contained material is used. Normally, the iron-contained material contains zinc, lead, fluorine, and chlorine and other substances in addition to iron.

It is necessary to perform the lead-collecting process and the zinc-collecting process in vacuum, as described above.

The vacuum degree in the lead-collecting process and that in the zinc-collecting process are not necessarily equal to each other, but a selected vacuum degree suitable for each of the lead-collecting process and the zinc-collecting process can be set, as will be described later. In the lead-collecting process, it is indispensable to select a condition in which the reduction and evaporation of zinc occur to a possible lowest degree.

The action of the present invention will be described below.

In the method, according to the present invention, of treating the dust exhausted from the melting furnace, the iron-contained material is melted, with the air inside the melting furnace shut out from the outside air. That is, the iron-contained material is melted without introducing fresh air into the melting furnace, namely, in a non-oxidizing atmosphere. In order to facilitate the melting of the iron-contained material, oxygen for the secondary combustion of CO gas may be injected into the melting furnace, provided that the quantity of oxygen is not so great as to damage the non-oxidizing atmosphere present therein.

The exhausted dust is collected by the dust collector without the exhausted dust being oxidized to a high extent. More specifically, irons contained in the exhausted dust at a weight percentage greater than any other substances is collected in the form of metal iron (Fe) and iron oxide (FeO). The amount of sufficiently oxidized ferric oxide ($Fe_2O_3$) contained in the collected exhausted dust is much smaller than that of ferric oxides contained in exhausted dusts collected by the conventional method. Normally, lead and zinc contained in the exhausted dust are collected in the form of lead oxide and zinc oxide, respectively.

Then, the exhausted dust containing the irons not oxidized to a high degree is heated in vacuum. Consequently, fluorine, water, chlorine, and lead evaporate from the exhausted dust, and are then collected. At this time, the lead in the form of lead oxide volatilizes in the form of oxide or is reduced by the irons contained in the exhausted dust and evaporates, and is then collected.

After the lead-collecting process is completed, the exhausted dust is heated in vacuum to collect zinc. Therefore, the degree of vacuum and the heating temperature or the treating period of time in carrying out the zinc-collecting process in vacuum are selected to allow zinc to be reduced and evaporated at a possible highest speed. In an appropriate condition, the zinc in the form of oxide is reduced by the irons contained in the exhausted dust as shown by the following equations and evaporates. That is, the zinc is collected in the form of vapor.

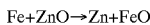
$Fe + ZnO \rightarrow Zn + FeO$

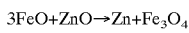
$3FeO + ZnO \rightarrow Zn + Fe_3O_4$

As described above, harmful substances, namely, the lead and the zinc can be collected sequentially without adding a reducing agent to the exhausted dust. That is, the irons contained in the exhausted dust serve as a reducing agent. Therefore, the operation of treating the exhausted dust can be accomplished much more efficiently than the conventional method. The collected materials such as the metallic zinc can be reclaimed. Further, the collected exhausted dust from which the zinc, the lead, and other substances have been removed can be reused as the iron-contained material.

Accordingly, the method of the present invention is capable of treating the exhausted dust resulting from the melting of the iron-contained material, without adding a reducing agent thereto.

Preferably, the melting furnace is an electric furnace; the iron-contained material is melted while CO gas is being injected into the electric furnace. The CO gas in the dust collector is recycled. Thus, the present invention can be embodied easily by using a conventional equipment.

That is, the construction of the fresh air-introducing portion of the conventional electric melting furnace is modified and CO gas is positively introduced into the electric melting furnace so that the air inside the electric melting furnace can be shut out easily from the outside air. In addition, the CO gas is returned to the electric melting furnace to utilize. Thus, the method of the present invention can be carried out at a lower cost.

Preferably, the lead-collecting process is performed at a vacuum degree of 0.1–10 Torr. The zinc-collecting process is performed at a vacuum degree of 0.1–1.0 Torr. If the vacuum degree in the lead-collecting process is more than 10 Torr, lead cannot be collected to a sufficient degree. The reason the lower limit value of the vacuum degree is set to 0.1 Torr is to prevent the manufacturing cost of the equipment from being high.

If the vacuum degree in the zinc-collecting process is more than 1.0 Torr, zinc cannot be reduced and evaporated sufficiently, whereas if the vacuum degree in the zinc-collecting process is less than 0.1 Torr, the manufacturing cost of the equipment is high.

EMBODIMENT

Embodiment 1

The method, according to the embodiment 1, of treating dust exhausted from a melting furnace will be described below with reference to FIG. 1.

In the embodiment 1, an electric melting furnace is used.

In melting an iron-contained material 8 in a melting furnace 1 and treating dust 7 exhausted therefrom, as shown in FIG. 1, the iron-contained material 8 is melted, with the air inside the melting furnace 1 shut out from the outside air, and gas exhausted from the melting furnace 1 is introduced into a dust collector 2 to collect the exhausted dust 7 contained in the exhausted gas. Then, a lead-collecting process is performed. That is, the exhausted dust 7 is heated in vacuum to collect water, chloride, chlorine, and lead. Thereafter, a zinc-collecting process is carried out. That is, the iron-contained material 8 is heated to collect metallic zinc contained in the exhausted dust 7, with the vacuum state kept.

The above process are described below in detail.

An equipment for carrying out the treating method comprises the electric melting furnace 1 (hereinafter referred to as melting furnace 1); the dust collector 2 connected with the melting furnace 1; and a vacuum reducing furnace 3 for treating the exhausted dust 7 collected by the dust collector 2.

As shown in FIG. 1, the melting furnace 1 is an arc furnace for melting the iron-contained material 8 by arc 19 emitted by a carbon electrode 11. The melting furnace 1 has an oxygen lance 12 for introducing oxygen for the secondary combustion of CO gas into an furnace body 10; and a CO gas-injection portion 13 for introducing the CO gas to be used to keep the atmosphere in the furnace body 10 reductive. The CO gas-injection portion 13 is connected with a return pipe 14 for returning the CO gas collected by the dust collector 2 to the CO gas-injection portion 13. The dust collector 2 will be described later in detail.

An exhaust pipe 16 is connected with the dust collector 2 and an exhaust port 155 of a hood 15 surrounding the melting furnace 1. There is provided a sealing material in the boundary between the hood 15 and the furnace body 10, between the hood 15 and the oxygen lance 12, between the hood 15 and the CO gas-injection portion 13, and between the hood 15 and the exhaust pipe 16 to prevent the outside fresh air from penetrating thereinto.

As described above, the dust collector 2 is connected with the exhaust pipe 16 extending from the hood 15 of the melting furnace 1, thus sucking the exhausted dust 7 and the atmosphere in the melting furnace 1 by means of an unshown sucking blower and collecting them. The CO gas contained in the exhaust gas is returned from the dust collector 2 to the furnace body 10 through the return pipe 14, whereas the exhausted dust 7 is dropped from the dust collector 2.

As shown in FIG. 1, the vacuum reducing furnace 3 comprises a feeding portion 30 for feeding the exhausted dust 7 to a first heating oven 31; the first heating oven 31 for carrying out the lead-collecting process; a second heating oven 32 for carrying out the zinc-collecting process; and a pressing chamber 33 having a press tool 331 for molding residue into a pressed material 75.

Heaters 41 and 42 are installed on the first heating oven 31 and the second heating oven 32, respectively. Vacuum pumps 43 and 44 are connected with the first heating oven 31 and the second heating oven 32, respectively to allow the inside of the first heating oven 31 and the second heating oven 32 to be vacuum. A first collector 45 for collecting chloride, water, and lead is interposed between the vacuum pump 43 and the first heating oven 31. A second collector 46 for collecting zinc is interposed between the vacuum pump 44 and the second heating oven 32.

The boundary between the first heating oven 31 and the second heating oven 32 and the boundary between the second heating oven 32 and the pressing chamber 33 are sealed except when the exhausted dust 7 is fed from the first heating oven 31 to the second heating oven 32 and from to the second heating oven 32 to the pressing chamber 33.

The procedure in carrying out the method by using the equipment is described below. First, the iron-contained material 8 is melted, with the CO gas being injected into the melting furnace 1 from the CO gas-injection portion 13. The iron-contained material 8 of the embodiment 1 consists of a mixture of 100 kg of scrap and 10 kg of carbon to evaluate the characteristic of the contents of collected materials experimentally.

In the initial stage in melting the iron-contained material 8, the atmosphere inside the furnace body 10 is kept to be reductive by the presence of the CO gas injected from the CO gas-injection portion 13. In the intermediate stage in melting the iron-contained material 8, an appropriate amount of oxygen is injected into the furnace body 10 from the oxygen lance 12 to burn the carbon contained in the iron-contained material 8 so that the temperature inside the furnace body 10 is raised to 1,650° C. and the melting of the iron-contained material 8 proceeds.

The exhausted dust 7 to be sucked together with the exhausted gas by the dust collector 2 in the melting process contains iron, zinc, lead, chloride, and water. As described above, the exhausted dust 7 and the CO gas injected into the furnace body 10 are sucked by the sucking blower of the dust collector 2, with the non-oxidizing atmosphere maintained in the melting furnace 1. Thus, the exhausted dust 7 is collected by the dust collector 2 without the iron, the zinc, and the lead being not oxidized to a high degree.

The dust 7 exhausted from the melting furnace 1 at a very high temperature is collected by the dust collector 2, with the exhausted dust 7 cooled to less than 100° C. while it is passing through the exhaust pipe 16. Accordingly, the irons contained in a collected exhausted dust 7(a) are not oxidized to a high degree in a short period of time when the irons are exposed to the atmospheric air, and are thus present in the form of Fe or FeO. The zinc in the exhausted dust 7(a) is oxidized to a higher extent than the irons in the vicinity of the room temperature and becomes zinc oxide (ZnO). Lead is also contained in the exhausted dust 7(a) in the form of metal or oxide in addition to fluorine, chlorine, and water. Table 2 shows a result obtained by analyzing the substances of the exhausted dust 7(a).

TABLE 2

| | Substances of exhausted dust collected from dust collector in Embodiment 1 | | | | | | | | | | |
|---|---|---|---|---|---|---|---|---|---|---|---|
| Substances | T.Fe | M.Fe | FeO | $Fe_2O_3$ | Zn | Mn | Pb | Al | Cl | F | O |
| wt. % | 45.3 | 20.5 | 31.9 | 0 | 16.3 | 2.8 | 3.05 | 0.42 | 3.81 | 0.01 | bal. |

Then, the exhausted dust 7 consisting of the above-described substances is treated by the vacuum reducing furnace 3.

First, the exhausted dust 7(a) is fed to the first heating oven 31 through the feeding portion 30. Then, the pressure in the first heating oven 31 is reduced to a vacuum degree of 10 Torr by the vacuum pump 43, and an exhausted dust 7(b) is heated to 900° C. for one hour. As a result, chlorine, fluorine, water, and lead evaporate from the exhausted dust 7(b) and are collected by the first collector 45. That is, the lead-collecting process is completed. At this time, zinc remains in the form of oxide in the exhausted dust 7(b).

Then, the exhausted dust 7(b) is transferred to the second heating oven 32. Then, the pressure in the second heating oven 32 is reduced to a vacuum degree of 0.2 Torr by the vacuum pump 44, and an exhausted dust 7(c) is heated to 950° C. for three hours. As a result, the zinc oxide contained in the exhausted dust 7(c) is reduced and evaporates, thus being collected by the second collector 46 as metallic zinc. That is, the zinc-collecting process is completed.

Tables 3 and 4 show the result obtained by analyzing substances of the residue of the exhausted dust 7(c) and the result by analyzing substances of the collected material containing metallic zinc, respectively.

Table 3 indicates that much amount of zinc, lead, and other substances were removed from the exhausted dust 7 in the zinc-collecting process and that the exhausted dust 7 can be used as the iron-contained material 8 again.

As indicated in table 4, the collected material containing the metallic zinc was as high as more than 92% in its purity and thus, can be reclaimed effectively.

TABLE 3

Substances of exhausted dust collected after
zinc-collecting process is completed in Embodiment 1

| Substances | T.Fe | M.Fe | FeO | $Fe_2O_3$ | Zn | Mn | Pb | Al | Cl | F | O |
|---|---|---|---|---|---|---|---|---|---|---|---|
| wt. % | 59.8 | 1.05 | 55.8 | 19.8 | 0.03 | 3.8 | 0.01 | 0.52 | 0.01 | 0.01 | bal. |

TABLE 4

Substances of exhausted material containing zinc
in Embodiment 1

| Substances | T.Fe | M.Fe | FeO | $Fe_2O_3$ | Zn | Mn | Pb | Al | Cl | F | O |
|---|---|---|---|---|---|---|---|---|---|---|---|
| wt. % | 0 | 0 | 0 | 0 | 92.1 | 0.02 | <0.01 | | | | bal. |

Then, a predetermined amount of an exhausted dust 7(*d*) remaining as the residue is sequentially fed to the gap between a pair of the press tools 331 in the pressing chamber 33 to subject the exhausted dust 7(*d*) to press molding. As a result, the pressed materials 75 are obtained. The pressed materials 75 are sequentially accommodated in a collection box 35 located below the pressing chamber 33. In this manner, a series of treatments of the exhausted dust 7 is completed.

As described above, according to the method of treating the exhausted dust 7, it can be treated without adding any reducing agents thereto, and substances contained therein can be collected in reclaimable states. That is, the zinc can be collected in the form of metal by the second collector 46, and the irons contained therein at the weight percentage greatest of all the contents remain as the residue which is molded into the pressed material 75.

That is, the method is capable of treating the exhausted dust very efficiently and contributing to an effective utilization of resources.

In the embodiment, the electric furnace is used as the melting furnace 1, but the exhausted dust can be treated similarly by using other melting furnaces such as a cupola, a converter, and the like.

While the invention has bee described with reference to embodiments, it is to be understood that modification or variations may be easily made by a person of ordinary skill in the art without departing from the scope of the invention which is defined by the appended claims.

What is claimed is:

1. A method of treating dust exhausted from a melting furnace in melting an iron-containing material, comprising lead, zinc, chloride, fluoride and other substances, which method comprises:

a) melting the iron-containing material, with air inside the melting furnace shut out from outside air, and collecting dust from the melting furnace into which a gas exhausted from the melting furnace and containing the dust is introduced;

b) performing a lead-collecting process and collecting water, chloride, fluorine, and lead by heating the exhausted dust in vacuum; and c) performing a zinc-collecting process in which a residue of the exhausted dust is heated in a vacuum, thereby allowing zinc contained in the dust to be reduced by making iron therein act as a reducing agent, according to the following:

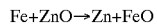

$Fe + ZnO \rightarrow Zn + FeO$

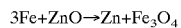

$3Fe + ZnO \rightarrow Zn + Fe_3O_4$ and collecting metallic zinc contained in the dust;
   and which method is effected without adding a reducing agent to said iron-containing material in either step b) or step c).

2. The method of claim 1, wherein in step a) the melting furnace is an electric furnace; and the iron-containing material is melted while CO gas is injected into the electric furnace; and CO gas in a dust collector is recycled.

3. The method of claim 1, wherein the lead-collecting process of step b) is performed at a vacuum at 0.1–10 Torr; and the zinc-collecting process of step c) is performed at a vacuum of 0.1–1.0 Torr.

4. The method of claim 1, wherein the melting furnace of step a) is a cupola.

5. The method of claim 1, wherein the melting furnace of step a) is a converter.

6. The method of claim 1, wherein said exhausted dust of step a) contains a reduced amount of ferric oxide ($Fe_2O_3$) such that the total amount of metallic iron (Fe) and iron oxide (FeO) is greater than the total amount of said $Fe_2O_3$.

7. The method of claim 1, wherein the zinc contained in the exhausted dust is reduced with iron originally contained in the dust which acts as a reducing agent by being heated in a vacuum.

* * * * *